V. K. STURGES.
BELTING.
APPLICATION FILED AUG. 5, 1909.

965,250.

Patented July 26, 1910.

Witnesses
A. M. Shannon
A. M. Dorr

Inventor
VARNEY K. STURGES

By
Attorneys

UNITED STATES PATENT OFFICE.

VARNEY K. STURGES, OF DETROIT, MICHIGAN, ASSIGNOR TO JOSEPH H. SCHULTE AND HENRY KAISER, OF DETROIT, MICHIGAN.

BELTING.

965,250.    Specification of Letters Patent.    Patented July 26, 1910.

Application filed August 5, 1909. Serial No. 511,413.

*To all whom it may concern:*

Be it known that I, VARNEY K. STURGES, a citizen of the United States of America, residing at Detroit, in the county of Wayne and State of Michigan, have invented certain new and useful Improvements in Belting, of which the following is a specification, reference being had therein to the accompanying drawings.

This invention relates to leather belting and more particularly to a belt formed of leather elements riveted or secured together in such relation that they provide a very wide side face for engagement with the flanges of a grooved pulley and at the same time are sufficiently flexible so as to wrap around the pulley of small diameter.

The invention consists in the matters hereinafter set forth, and more particularly pointed out in the appended claims.

Figure 1:
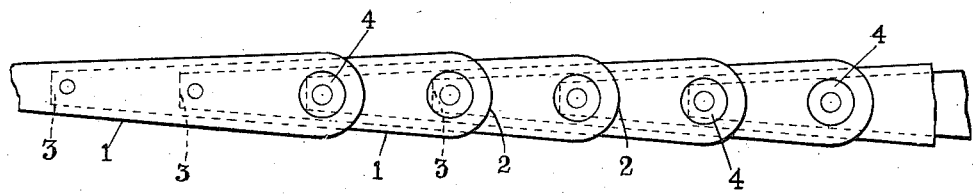
Figure 2:
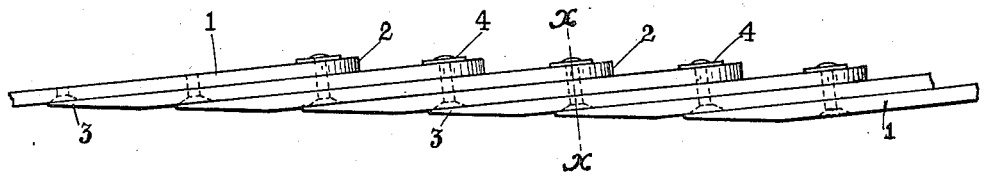
Figure 3:

In the drawings, Figure 1 is a plan view of belting embodying features of the invention; Fig. 2 is a view in side elevation thereof; and Fig. 3 is a view in cross section on the line $x$—$x$ of Fig. 2.

Referring to the drawings a series of leather strips 1 have rounded wide ends 2 from which they are uniformly tapered to square narrowed ends 3. These links are placed in over-lapping relation with their wider ends forming the outer face of the belt and their inner ends thinned or tapered to form a substantially continuous inner face. They are secured by rivets 4 which pass through the wide end of each link and the superposed bodies of the two adjacent links. The elements are so arranged that each rivet passes through three of them. By this arrangement a pyramidal or wedge shape cross section is obtained which provides a very wide pair of margins 5 formed by the adjacent edges of the links. These wide side faces give good frictional contact with a grooved pulley while the belt is extremely flexible.

The belt may be constructed of waste or scrap matter so that it is of very low cost and presents the flexibility of a link belt and the additional property of having wide faces for use on flanged or grooved pulleys.

What I claim as my invention is:

1. Belting consisting of a series of overlapping flexible, longitudinally tapered strips, and a rivet securing the wider end of each strip to the bodies of a pair of adjacent strips, the free inner end of each strip overlapping the head of the adjacent rivet.

2. Belting consisting of a series of overlapping flexible, longitudinally tapered strips, and a rivet securing the wider end of each strip to the bodies of a pair of adjacent strips, the inner free tapered ends of the strips being beveled to form a substantially continuous inner belt face, and being adapted to overlap the heads of the adjacent rivets.

3. Belting comprising a series of flexible longitudinally tapered elements whose wider ends form the outer face of the belt and whose inner tapered ends are beveled to form a continuous inner belt face, and rivets each securing the broad end of one element to the bodies of two adjacent elements, each element being secured to adjacent elements by a pair of rivets, and the free inner end of each element overlapping the head of the adjacent rivet.

In testimony whereof I affix my signature in presence of two witnesses.

VARNEY K. STURGES.

Witnesses:
C. R. STICKNEY,
LEWIS E. FLANDERS.